(12) United States Patent
Rhodes et al.

(10) Patent No.: US 7,077,451 B2
(45) Date of Patent: Jul. 18, 2006

(54) STADIUM STYLE MOTOR VEHICLE SEAT

(75) Inventors: Louis A Rhodes, Farmington Hills, MI (US); Douglas J Quigley, Rochester, MI (US); Joseph L Salani, Oxford, MI (US); Carl Mather, Lake Orion, MI (US); John V Keane, Auburn Hills, MI (US); David J Ewers, Leonard, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 197 days.

(21) Appl. No.: 10/646,188

(22) Filed: Aug. 22, 2003

(65) Prior Publication Data

US 2004/0100117 A1 May 27, 2004

Related U.S. Application Data

(60) Provisional application No. 60/405,453, filed on Aug. 23, 2002.

(51) Int. Cl.
*B60N 2/02* (2006.01)

(52) U.S. Cl. .................................................. 296/65.01
(58) Field of Classification Search ................ 296/63, 296/65.01, 66, 65.02, 65.05, 65.16; 297/130, 297/15
See application file for complete search history.

(56) References Cited

U.S. PATENT DOCUMENTS

| 1,158,223 | A | * | 10/1915 | Huschle, Jr. ................. 296/66 |
| 4,005,902 | A | * | 2/1977 | Balin .......................... 297/129 |
| 5,038,437 | A | | 8/1991 | Russell et al. |
| 5,195,795 | A | * | 3/1993 | Cannera et al. .......... 296/65.09 |
| 5,269,581 | A | * | 12/1993 | Odagaki et al. ............... 296/66 |
| 5,482,349 | A | * | 1/1996 | Richter et al. ................ 297/15 |
| 5,492,386 | A | | 2/1996 | Callum ........................ 296/64 |
| 5,527,087 | A | * | 6/1996 | Takeda et al. ................ 297/15 |
| 5,542,745 | A | * | 8/1996 | Takeda et al. .......... 297/378.12 |
| 5,570,931 | A | | 11/1996 | Kargilis et al. |
| 5,839,773 | A | * | 11/1998 | Ban et al. ................. 296/65.09 |
| 5,871,255 | A | | 2/1999 | Harland et al. |
| 5,890,758 | A | | 4/1999 | Pone et al. |
| 5,975,612 | A | | 11/1999 | Macy et al. |
| 5,979,964 | A | | 11/1999 | Ban et al. ...................... 296/66 |
| 6,000,751 | A | | 12/1999 | Kato et al. ..................... 297/15 |
| 6,089,641 | A | | 7/2000 | Mattarella et al. |
| 6,106,046 | A | * | 8/2000 | Reichel ................... 296/65.09 |
| 6,123,380 | A | | 9/2000 | Sturt et al. .............. 296/65.09 |
| 6,129,404 | A | | 10/2000 | Mattarella et al. |
| 6,193,317 | B1 | | 2/2001 | Mitschelen et al. |
| 6,231,101 | B1 | | 5/2001 | Kamida et al. ................ 296/63 |
| 6,234,553 | B1 | | 5/2001 | Eschelbach et al. ..... 296/65.14 |

(Continued)

*Primary Examiner*—H Gutman
(74) *Attorney, Agent, or Firm*—Ralph E. Smith

(57) ABSTRACT

A seat assembly for a motor vehicle having a tub disposed at least partially in a floor of the vehicle. The seat assembly comprises at least one rear leg non-releasably secured to the floor of the vehicle. The at least one rear leg is pivotable to stow the seat assembly in the tub.

7 Claims, 2 Drawing Sheets

U.S. PATENT DOCUMENTS

| | | |
|---|---|---|
| 6,279,982 B1 * | 8/2001 | Nishimura et al. ...... 296/65.09 |
| 6,332,650 B1 | 12/2001 | Krist et al. |
| 6,352,310 B1 | 3/2002 | Schmidt et al. |
| 6,371,559 B1 | 4/2002 | Kienzle et al. |
| 6,398,307 B1 | 6/2002 | Schmidt et al. |
| 6,406,084 B1 | 6/2002 | De Campos et al. |
| 6,416,107 B1 | 7/2002 | Kanaguchi et al. |
| 6,425,619 B1 | 7/2002 | Ney |
| 6,464,279 B1 | 10/2002 | Schambre et al. |
| 6,682,120 B1 * | 1/2004 | Kamida et al. .......... 296/65.09 |
| 6,688,666 B1 * | 2/2004 | Neale et al. ............. 296/65.09 |
| 6,705,658 B1 * | 3/2004 | Jach et al. ............... 296/65.09 |
| 2001/0002759 A1 * | 6/2001 | Nishide ................... 296/65.09 |
| 2001/0054835 A1 | 12/2001 | Feng ......................... 297/232 |

* cited by examiner

STADIUM STYLE MOTOR VEHICLE SEAT

CROSS-REFERENCE TO RELATED APPLICATION(S)

This application claims the benefit of Provisional Patent Application No. 60/405,453, filed Aug. 23, 2002.

TECHNICAL FIELD OF THE INVENTION

This invention relates generally to seats for motor vehicle seats, and relates more specifically to a seat that folds to provide a flat surface.

BACKGROUND OF THE INVENTION

Many motor vehicles, particularly sport utility vehicles and minivans, are equipped with rear seats that can be moved from a seating configuration, in which passengers can sit in the seat, to a so-called "load floor" configuration where the back support of the seat is folded downwardly to assume a horizontal orientation and thereby facilitate cargo stowage. Typically, locking mechanisms are provided for holding the seat in the seating configuration, and the locking mechanisms can be released to permit moving the seat to the load floor configuration.

One example of such a design is U.S. Pat. No. 6,089,641, assigned to the assignee of the present invention and hereby incorporated by reference. This patent teaches a passenger vehicle seating arrangement in which the second and third row seats fold down to form a cargo carrying platform.

SUMMARY OF THE INVENTION

One aspect of the present invention is a seat assembly for a motor vehicle having a tub disposed at least partially in a floor of the vehicle. The seat assembly comprises at least one rear leg non-releasably secured to the floor of the vehicle. The at least one rear leg is pivotable to stow the seat assembly in the tub.

Accordingly, it is an object of the present invention to provide a seat assembly of the type described above can be moved to a seating configuration and to a load floor configuration.

Another object of the present invention is to provide an assembly of the type described above that is easy to use and cost-effective.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PREFERRED EMBODIMENTS

Figure 1:
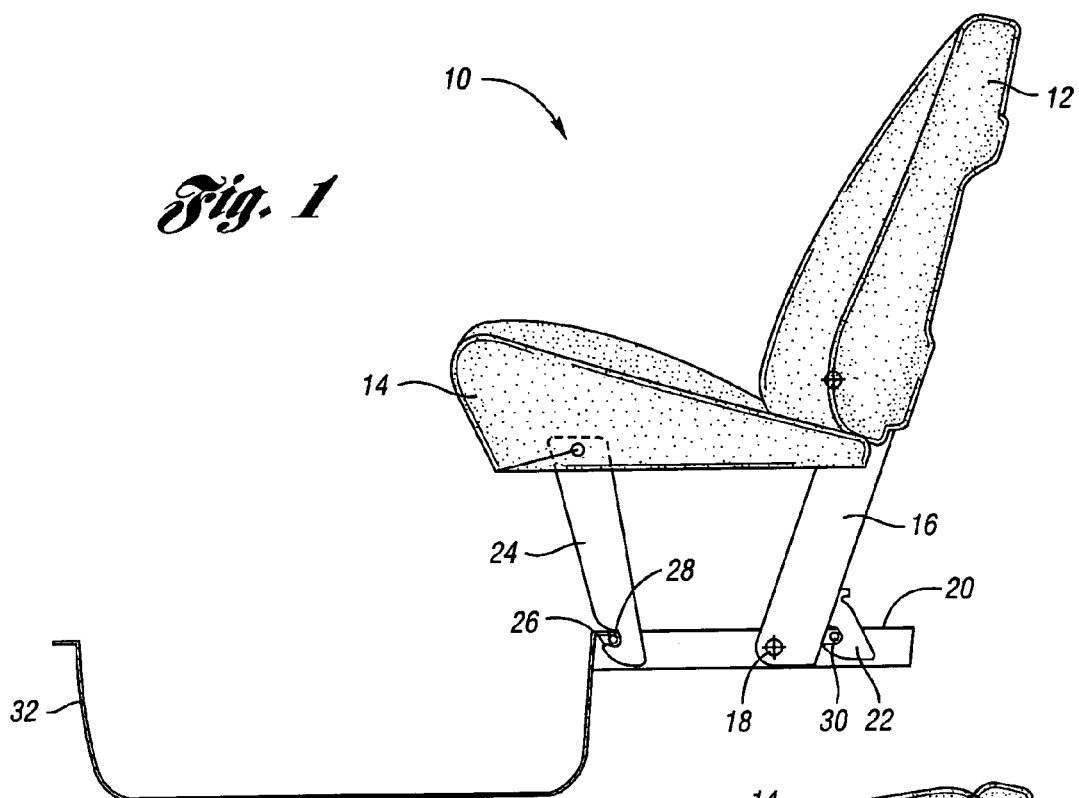
FIG. 1 is a schematic side view of a seat assembly according to the present invention in an upright, use position.

FIG. 1 shows one embodiment 10 of a seat assembly according to the present invention for a motor vehicle. The seat assembly 10 includes a seatback 12 and a seat cushion 14. The seatback 12 and seat cushion 14 normally assume use positions, as shown in FIG. 1, in which the seat cushion 14 is generally horizontal and the seatback 12 is generally upright in order to support the back of an occupant. The seatback 12 includes a rear pair of legs 16 that are pivotably attached to an anchor point 18 in or slightly above a floor 20 of the vehicle. A catch 22 releasably retains at least one of the legs 16, and more generally the seatback 12, against rotation about the anchor point 18. A front pair of legs 24 are pivotably attached at their upper ends to the seat cushion 14. At their opposite lower ends, the front legs 24 are provided with structure such as a notch 26 that releasably engages a pin 28 secured in the vehicle relative to the floor 20.

Figure 2:
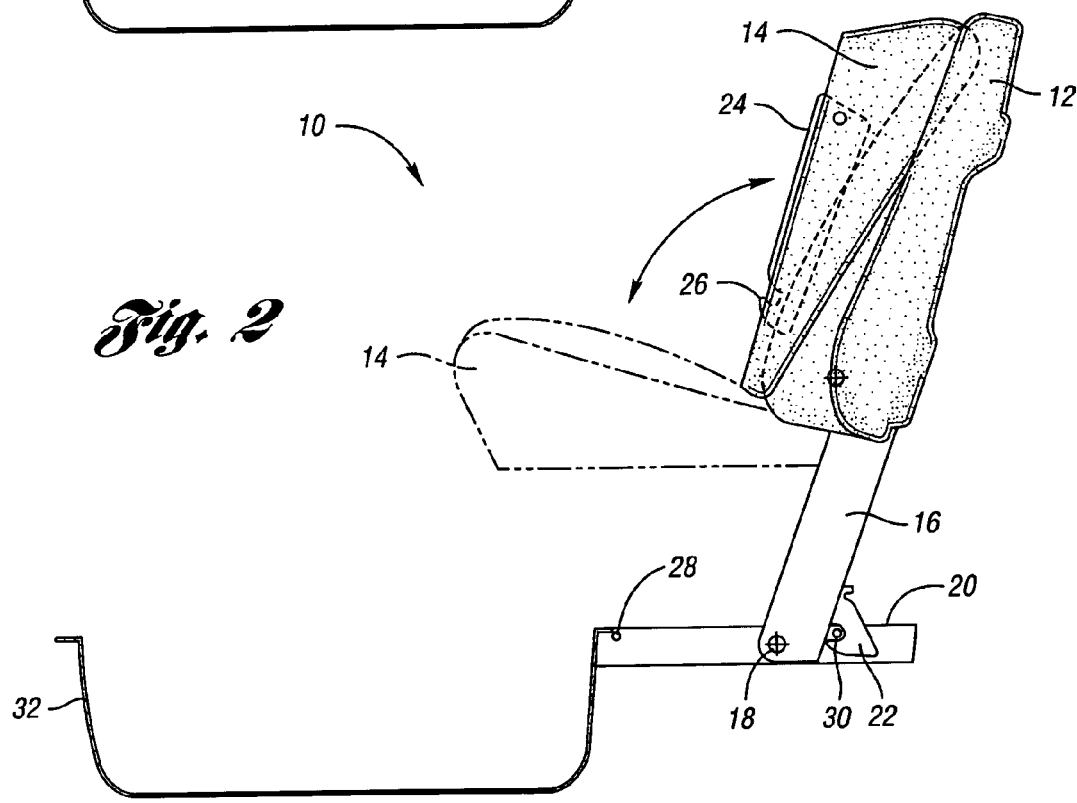
FIG. 2 is a schematic side view of the seat assembly with a seat cushion folded proximate a seat back.
Figure 3:
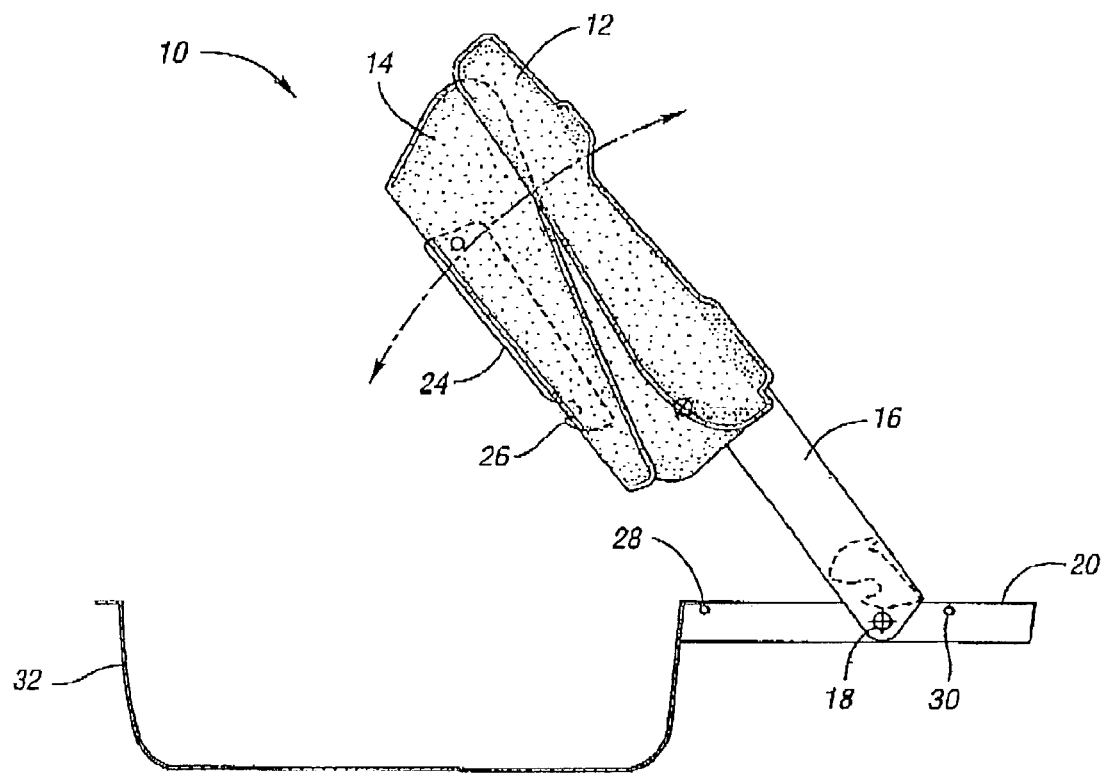
FIG. 3 is a schematic side view of the seat assembly in a partially rotated position.

FIGS. 2 and 3 show the rotation of the seat assembly 10 between its use position and a stowed position. As shown in FIG. 2, the seat cushion 14 is pivotable in any known manner from its use position toward positions more closely proximate the seat back 12. To accomplish this rotation, the front legs 24 are first unlocked by removing the notches 26 from the pins 28, and rotating the front legs in a counter-clockwise direction as shown in the figures up against or at least partially within the bottom of the seat cushion 14. It should be appreciated that the front legs 24 may be biased into and/or retained in this position in any well known fashion. As shown in FIG. 3, the entire seat assembly 10 may then be rotated about the pivot 18 in a counterclockwise direction as shown. To accomplish this rotation, the rear legs 16 are first unlocked by releasing the catch 22 from a pin 30 secured in the vehicle relative to the floor 20.

Figure 4:
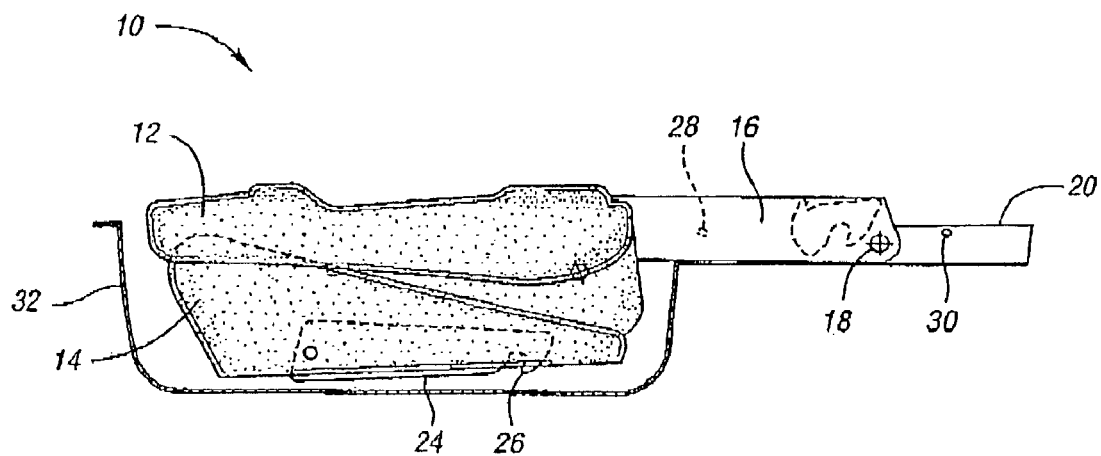
FIG. 4 is a schematic side view of the seat assembly in a stowed position.

FIG. 4 shows the seat assembly 10 lowered into a tub 32. The tub 32 is recessed below the level of the vehicle floor 20, and may be overlayed by a cover (not shown) when the seat assembly 10 is in use. In general, the depth of the tub 32 may be chosen to present a surface generally even with the vehicle floor 20. Thus, the tub 32 may have one given depth if the rear of the seatback 12 presents the load floor, while a second, greater tub depth may be provided if the cover overlying the tub when the seat assembly is upright is also used to cover the seat assembly in the stowed position.

The present invention thus provides a seat assembly that moves between a seating configuration and a configuration allowing the presentation of a relatively flat load floor. While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A seat assembly for a motor vehicle having a floor, the seat assembly comprising:
   a tub disposed at least partially in the floor;
   at least one rear leg non-releasably secured to the floor of the vehicle rearward of the tub, the at least one rear leg being pivotable to stow the seat assembly in the tub;
   a seatback fixedly mounted on the at least one rear leg; and at least one front leg releasably secured to the floor of the vehicle rearward of the tub.

2. The seat assembly of claim 1 wherein the at least one front leg is positioned proximate a seat cushion of the seat assembly when the seat assembly is stowed in the tub.

3. The seat assembly of claim 1 wherein the seatback is rigidly mounted on the at least one rear leg.

4. The seat assembly of claim 1 wherein the seatback presents a load floor when the seat assembly is stowed in the tub.

5. The seat assembly of claim 1 wherein the load floor is generally even with the floor of the vehicle.

6. A seat assembly for a motor vehicle having a tub disposed at least partially in a floor of the vehicle, the seat assembly comprising:
   at least one rear leg non-releasably secured to the floor of the vehicle rearward of the tub, the at least one rear leg being pivotable to stow the seat assembly in the tub; and
   at least one front leg releasably secured to the floor of the vehicle rearward of the tub.

7. The seat assembly of claim 6 wherein the at least one front leg is positioned proximate a seat cushion of the seat assembly when the seat assembly is stowed in the tub.

* * * * *